E. W. WESCOTT.
CHLORIDIZING APPARATUS.
APPLICATION FILED MAY 14, 1920.

1,406,596.

Patented Feb. 14, 1922.
3 SHEETS—SHEET 1.

INVENTOR.
Ernest W. Wescott,
BY K. P. McElroy
his ATTORNEY.

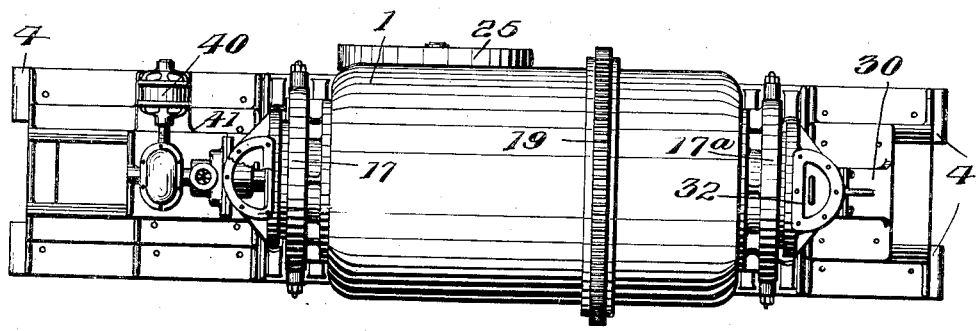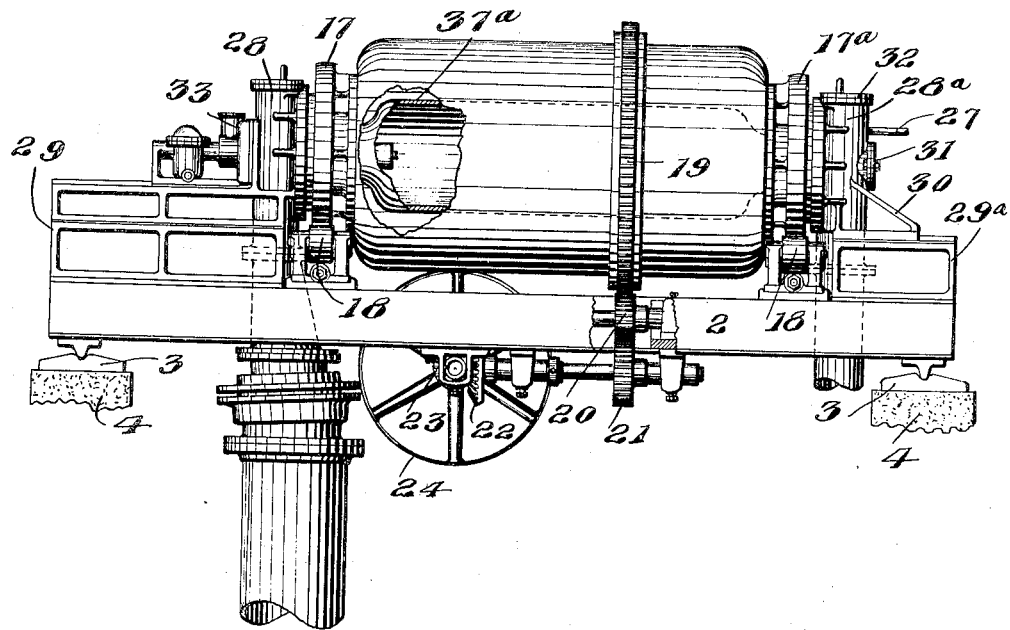

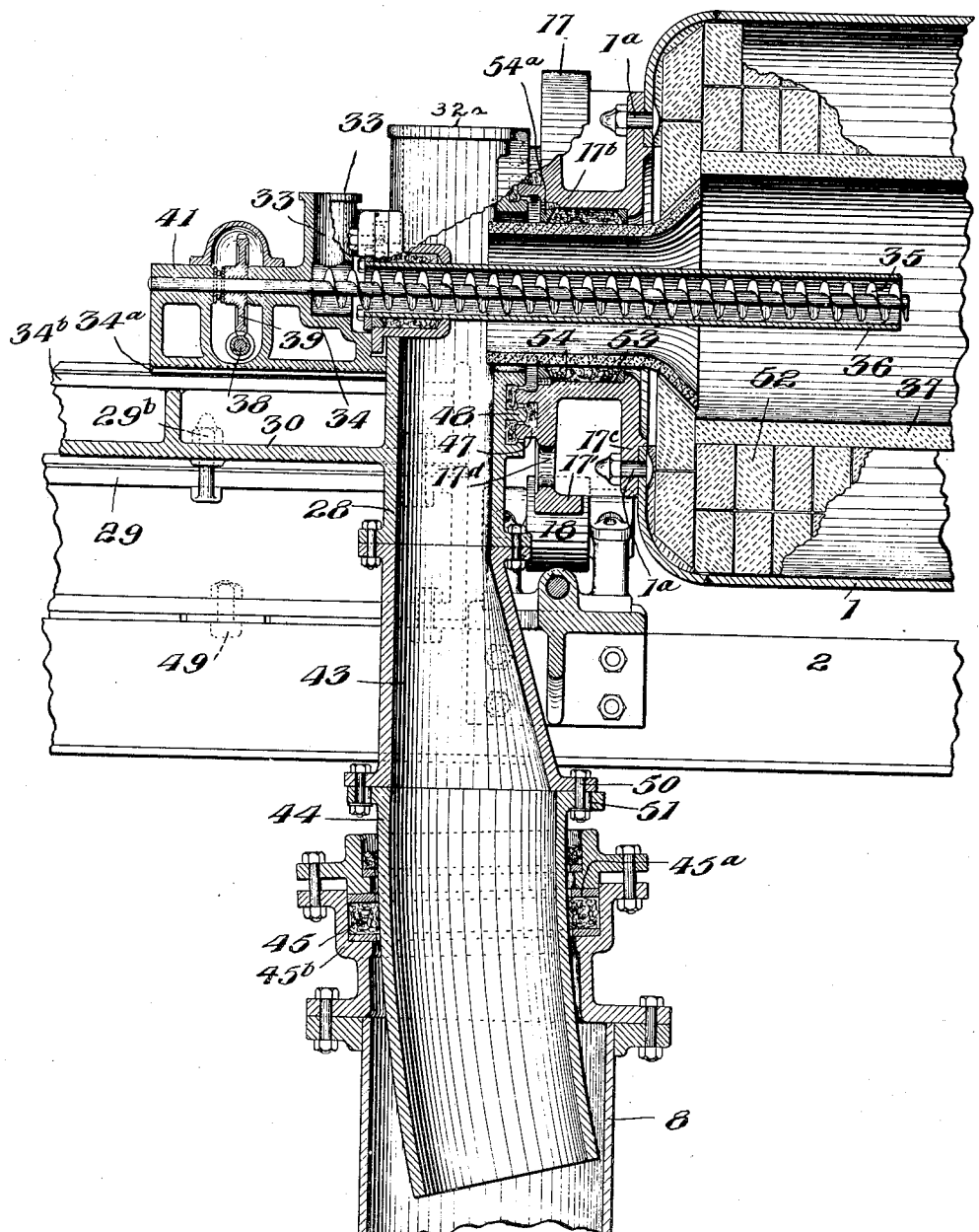

UNITED STATES PATENT OFFICE.

ERNEST W. WESCOTT, OF NIAGARA FALLS, NEW YORK, ASSIGNOR TO KALMUS, COMSTOCK & WESCOTT, INCORPORATED, OF BOSTON, MASSACHUSETTS, A CORPORATION OF MASSACHUSETTS.

CHLORIDIZING APPARATUS.

1,406,596.      Specification of Letters Patent.      Patented Feb. 14, 1922.

Application filed May 14, 1920. Serial No. 381,350.

*To all whom it may concern:*

Be it known that I, ERNEST W. WESCOTT, a citizen of the United States, residing at Niagara Falls, in the county of Niagara and State of New York, have invented certain new and useful Improvements in Chloridizing Apparatus, of which the following is a specification.

This invention relates to chloridizing apparatus; and it comprises an apparatus particularly adapted for the treatment of various arsenical ores, and in particular arsenical cobalt and nickel ores, to fit them for recovery of contained values by wet treatment by removing arsenic and iron; such apparatus comprising a refractory lined rotary treating vessel, stationary housing means in conjunction therewith, sealing means adapted to preserve tight joints between the rotary elements and stationary elements, means for introducing chlorin and ore into the rotary device, means for removing fixed chlorids formed and means for condensing and recovering volatilized chlorids; all as more fully hereinafter set forth and as claimed.

Treatment of many arsenical ores to get rid of the arsenic and recover the other values in any cheap, simple and economical manner is quite difficult. This is particularly true of such cobalt ores as are found in the cobalt district of Ontario; but it is also true of very many other ores. The presence of the arsenic complicates metallurgical operations. These ores contain cobalt or nickel or both, together with arsenic. Iron is always present. Frequently they also contain more or less silver or copper. I have found (see application Serial No. 349,578) that a ready method of treatment with separation and removal of arsenic, and also of iron, is afforded by passing chlorin in countercurrent over the finely divided ore. This results in the formation of vapors of arsenious chlorid with development of heat; the heat evolution with ores rich in arsenic being large. The amount of heat evolved is usually sufficient to take care of all heating requirements. It is more often necessary to moderate the heat than to add to it. If the temperature is kept between, say, 400° and 600° C. the arsenic volatilizes and most of the iron goes with it as ferric chlorid. Cobalt, nickel, silver, copper, etc., are also converted into chlorids and remain behind in a form susceptible of treatment by various wet processes for extracting and separating the values. The volatilized arsenious chlorid and ferric chlorid can be condensed and separated.

In the present invention I have devised an apparatus particularly adapted for use in the performance of the described process although useful in other relations. In this apparatus I provide a rotary kiln-like structure of any material adapted to resist the action of chlorin. Ordinary ceramic materials, such as clay may be employed. Graphite tubes or graphite lined tubes may be used. Enameled steel may be employed. The reaction chamber I ordinarily provide with a jacketing coating of heat-insulating material. It is convenient and advantageous to support the reaction chamber within a steel or iron shell and locate the insulating material, therebetween. Means for rotating the chamber, means for introducing finely powdered ore, means for removing volatilized chlorids and means for removing the chloridized solid material are also provided. As the reaction results in the production of poisonous vapors of arsenious chlorid it is necessary to provide effectual sealing means between the ends of the rotating kiln and the stationary elements connected therewith. This may be readily accomplished by providing the ends of the inclosing casing with an air cooled extension having a plurality of flanged annular rotating lugs, with corresponding annular lugs on the stationary element and packing material to make a tight joint therebetween. The apparatus is provided with suitable condensing means adapted to condense and recover all the vapors formed. Advantageously the arrangement of the condensing means is such as to provide some suction so that the apparatus may work under slightly less than atmosphere pressure, thereby obviating outward leakage of vapors.

In the accompanying illustration I have shown more or less diagrammatically an apparatus embodying the described invention and useful for the described purposes.

In this showing

Fig. 2 is a top plan view of the chloridizing chamber and connections;

Fig 3 is a side elevation of the structure of Fig. 2, partly broken away to show the interior construction, and a modified form, and Fig. 4 is a fragmentary view, partly in side elevation and partly in central vertical section, showing one end of the chloridizing chamber and its connection to the condensing means.

Figure 1:
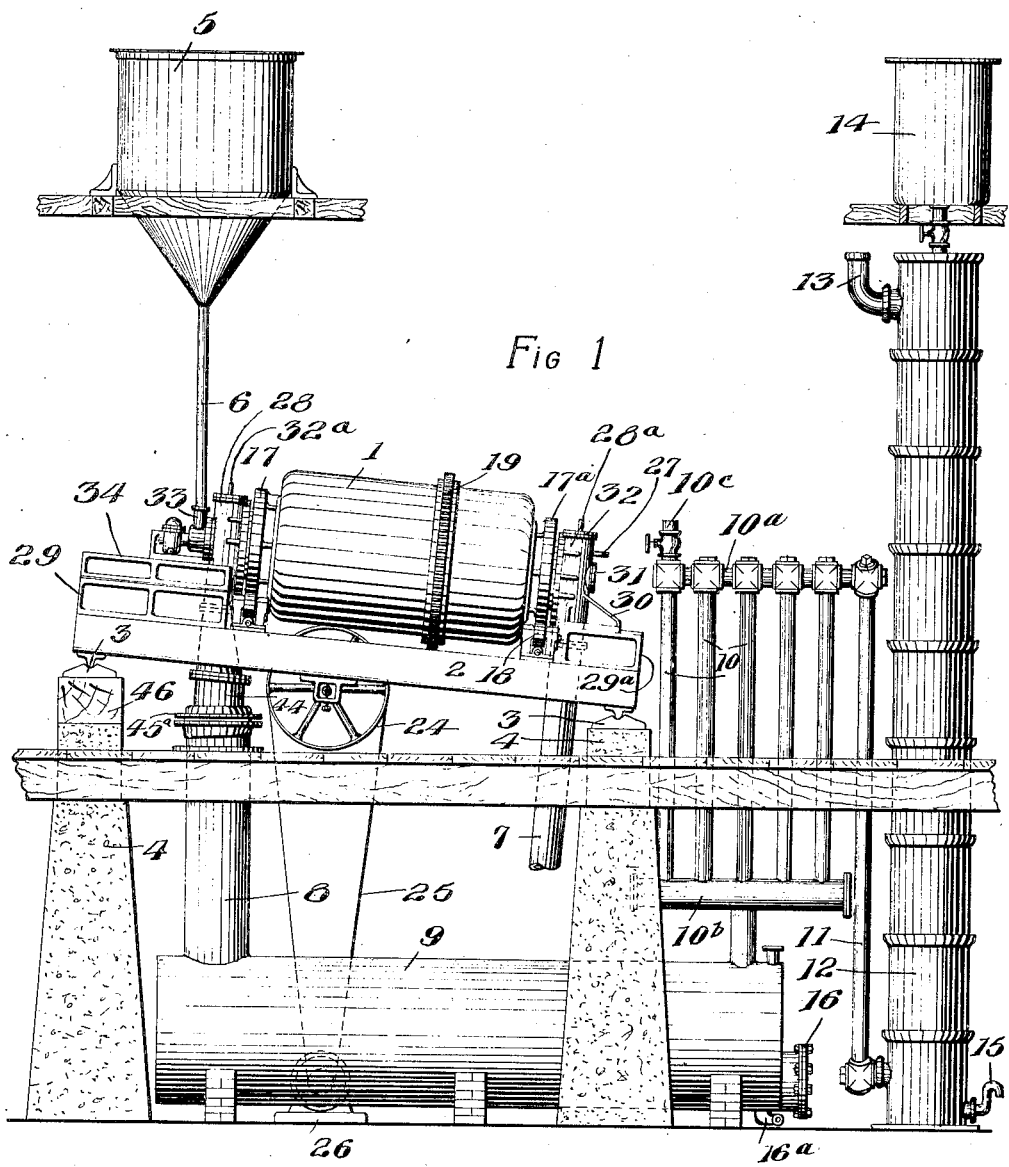
Figure 1 is a view in side elevation of a complete apparatus.

As shown, the apparatus comprises a rotatable drum 1, set at an incline, mounted upon frame 2, the frame resting on pillow blocks 3 of concrete or the like piers, 4.

The ore hopper 5 communicates through feed tube 6 with one end of the apparatus, while at the other end the finished solid chlorids are discharged through chute 7 into any convenient receptacle (not shown). Volatilized chlorids formed in the operation find exit from the chloridizing chamber into a riser 8 leading to the condensing apparatus. This latter apparatus includes a trap tank 9 in communication with an air-cooled condenser 10, shown as a series of air-cooled tubes passing between headers $10^a$ and $10^b$. This air-cooled condenser is provided with valved outlet $10^c$ for venting purposes. Residual uncondensed vapors and gases find exit from the condenser through pipe 11 leading to a tower 12. These gases and vapors pass upwardly in tower 12 which is provided at its top with a pipe connection 13 leading to any convenient aspirating or suction means (not shown). A scrubbing liquid, such as caustic soda solution, may be led into the tower from tank 14. The interior of the tower may be of any usual structure adopted in scrubbing devices. Liquid passing through the tower is removed through goose-neck connection 15. The trap tank 9 is provided with a clean out manhole 16 through which solids may be removed from time to time. Liquids may be removed from this tank through valved pipe $16^a$ connected to a suitable pump or the like, not shown.

Returning to the rotatable drum, or reaction chamber, this is shown as comprising a steel or other metal shell 1 supported by riding rings 17 and $17^a$, located respectively at the ore end and the chlorid discharge end. These rings are carried by and rest on adjustable roller bearings 18 mounted on the frame 2. Rotation is effected by girth gear 19 meshing with a gear train composed of spur gears 20 and 21 and bevel gears 22 and 23. Power is given by pulley 24 and motor 26, (Fig. 1).

Gas for the purposes of reaction (usually chlorin) is introduced into the chamber through pipe 27 at the end of the apparatus where the chlorids are discharged, passing through an end casting $28^a$. As shown this end casting is provided with a bracket 30 supported on a guide block $29^a$. The other end of the apparatus is provided with a similar end casting 28 having the bracket or extension 30 supported by the guide block 29.

This construction affords access to either end of the apparatus for inspection and repairs, packing stuffing glands, etc. The end casting $28^a$ at the chlorid discharge end is provided with a closable port 31 for the purpose of cleaning and inspection. It enables the interior of the apparatus to be raked out without moving the end casting on the guide ways, $29^a$. This end casting $28^a$ is also provided at the top with another closable port 32 for the purpose of cleaning out. A similar port $32^a$ is provided for the other end casting 28.

Ore going from the hopper through the feed tube 6 previously described is received in inlet 33 attached to the casting 34, this casting being provided with the guide way or extension $34^a$. As shown (see Fig. 4) ore from the hopper 5 is fed forward through the inlet 33 by screw conveyer 35 in conveyer conduit 36. It passes into the reaction chamber proper indicated as 37. This chamber is located within an outer steel or iron shell 1, the space between this chamber and shell being filled with heat insulating fire brick 52. The screw conveyer is driven through worm gear 38 and gear 39 by motor 40 (best shown in Fig. 2).

These parts are rigid with and connected to the inlet casting 34 having the end 41 through which the conveyer shaft passes. The inlet casting 34 with its guide $34^a$ is adapted to move longitudinally on the guide way $34^b$ integral with the end casting 28.

In addition to providing means for removing the screw conveyer casting and inlet 34 and its parts on guide way $34^b$, provision is also made for removing the condenser end castings 28 and $28^a$. The frame 2 supports the ways 29 and $29^a$, bolts and nuts 49 (shown in dotted lines in Fig. 4) being provided for holding the ways 29 and $29^a$ against longitudinal movement. The end castings 28 and $28^a$ may be moved on the ways 29 and $29^a$, nuts and bolts $29^b$ being provided for holding these parts together in operative position.

The adapter pipe 43 which is connected to the condenser end casting 28 is bolted to a curved pipe 44 adapted to slide through the packing 45 as the frame 2 is raised or lowered, the raising or lowering of the frame being necessary at times for adjusting the inclination of the rotary chloridizing chamber for the purpose of varying the flow of ore therethrough. The chamber may be tilted by inserting blocks 46 (Fig. 1) of the desired thickness between the pillow blocks 3 and the head of the piers 4. The pivotal point about which the apparatus is tilted in raising or lowering as desired is the bearing depression in the pillow block 3. During such raising or lowering all parts of the apparatus describe arcs about this pivotal point. To provide a gas tight seal between the condenser trap riser 8 and the condenser end casting 28, the condenser extension pipe 44 is laid about an arc centered at the pivotal point and the packing ring 45$^a$ is supported by the stuffing box casting 45$^b$ on a radial line from the pivotal point.

To afford a gas tight connection between the revolving drum 1 and the stationary end castings 28 and 28$^a$, a series of concentric packing rings 47 is provided, as shown in Fig. 4. This packing arrangement consists of two sets of packing in the stationary castings 28 and 28$^a$ and one each in the riding rings 17 and 17$^a$ and a pressure ring 48 on the stationary castings 28 and 28$^a$, while two such pressure rings 47 each are provided on each of the riding rings 17 and 17$^a$. Wear, due to service, may be taken up by advancing the castings 28 and 28$^a$ toward the drum 1 along the ways 29 or 29$^a$ thus compressing the packing.

The rings 17 and 17$^a$, in substance, comprise hub portion 17$^b$ and two flanges, one of the flanges 17' serving as a bearing ring to rotate on roller 18, and the other flange 17$^c$ serving for the purpose of attaching the bearing ring to the end of the reaction chamber by means of bolts 1$^a$. This construction provides large radiating surfaces and permits disposing the packing at a point some distance from the end of the reaction chamber. Air enters the space between the flanges 17 and 17$^c$ and cools the inner face of the ring 17 as well as the hub portion of this bearing ring. The bearing ring of flange 17' may also be provided with a plurality of holes 17$^d$ for admission of air and to assist in the cooling.

As above mentioned, the castings 28 and 28$^a$ are movable longitudinally on the ways 29 and 29$^a$ and are retained in the desired position on these ways by a series of clamp bolts 29$^b$, one of which is shown in Fig. 4. When it becomes necessary to adjust the condenser end castings 28 and 28$^a$ relative to the drum 1, the bolts 50 in the lower end of the adapter 43 are loosened so that the adapter 43 may slide on the flange of the curved extension pipe 44, the bolt holes 51 in which are slotted.

The reaction chamber 37 (Fig. 4) is composed of a fire clay cylindrical lining supported in and heat insulated from the drum 1 by the fire brick 52, and is connected at either end by the reducing adapter 53; a graphite or clay funnel shaped refractory tube held in place by the packing 54 in the riding rings 17 and 17$^a$.

It is obvious that other forms of reaction chambers are suitable for use in this apparatus, as for instance, the form shown in Fig. 3, which consists of the graphite bottle-necked retort 37$^a$ terminated at both ends by a continuous member of the general shape and size of the reducing adapter 53 (Fig. 4). The riding rings, 17 and 17$^a$ being bolted to the drum 1 by the bolts 1$^a$ (Fig. 4), may be readily removed to permit the placing of a unit reaction chamber of the bottle-necked type 37$^a$ (Fig. 4) through the large opening in the ends of the drum 1. The bottle-necked reaction chamber 37$^a$ being positioned within the drum 1, the riding rings 17 and 17$^a$ are then replaced. The packing 54 (Fig. 4) is positioned about the neck, corresponding to the reducing adapter 53, of the reaction chamber and is compressed and held in place by the packing ring 54$^a$.

Any suitable heat insulator may be used to fill the space between the reaction chamber 37$^a$ and the drum 1. The preferred construction, however, is shown in detail in Fig. 4.

Leakage at the joints between the rotary and stationary parts is undesirable. It is undesirable both that chlorin and arsenious chlorid vapors should pass outward and that any substantial amount of air should pass inward. For this reason it is best to maintain the whole apparatus under a pressure slightly below atmospheric; it being best however to make the reduction in pressure as little as is consistent with good operating conditions. As slight a degree of vacuum as one-two hundredths of an inch of water works well.

What I claim is:—

1. In apparatus for chloridizing arsenical ores, means for passing chlorin and ore in countercurrent at a relatively high temperature, means for withdrawing, condensing and collecting arsenious chlorid produced thereby and scrubbing means for removing vapors from the residual gases leaving the condensing means.

2. A rotatable inclined reaction chamber, means for introducing chlorin at the lower end, means for withdrawing fixed chlorids at such lower end, means for introducing ore at the upper end, means for withdrawing vapors from the upper end and sealing means for preventing escape of such vapors.

3. A reaction chamber having an end sealed by detachable means, supports for such detachable means, and means attached to the detachable means and slidably engaging said supports.

4. A rotary reaction chamber having an end sealed by detachable means, with respect to which the chamber is rotatable, packing between the said rotatable chamber and said detachable means, a support for the detachable means, and means attached to the detachable means and slidably engaging said support.

5. A reaction chamber having an end sealed by detachable means constituting an exit for products of the reaction, a support for such detachable means, and means attached to the detachable means and slidably engaging said support.

6. A reaction chamber having an end detachably secured thereto, such end comprising means for discharging material into said chamber and means for removing products of reaction from the chamber, means for slidably moving the product removing means and the material feeding means relative to the chamber, and means for slidably moving the product removing means and the material feeding means relatively to each other.

7. A reaction chamber having an end detachably secured thereto and comprising material feeding means, the said material feeding means being connected to said end in slidable relation.

8. A reaction chamber having an end sealed by means of a detachable member adapted to remove products of reaction, a conduit leading from said member toward a point of delivery for said products, a connection between said member and said conduit, a support for said member, and means engaging said support and connected to said member whereby the discharge member may be disconnected from said chamber upon the breaking of the connection between the discharge member and said conduit.

9. A reaction chamber and supports therefor, means permitting elevation of or lowering of an end of the reaction chamber to change the inclination thereof, discharge means for directing products of reaction from the reaction chamber, a conduit connected to said last means for delivering the products of reaction to a point without said chamber, a closed casing in which said conduit is suspended, and packing between said conduit and said closed casing, whereby when one end of the machine is elevated the said conduit may move relative to said casing and be maintained in gas tight communication therewith.

10. A reaction chamber and supports therefor, means permitting elevation of or lowering of an end of the reaction chamber to change the inclination thereof, discharge means for directing from the reaction chamber products of reaction, a curved conduit connected to said last means for delivering the products of reaction to a point without said chamber, a closed casing in which said conduit is suspended, and packing between said conduit and said closed casing whereby when one end of the machine is elevated the said conduit may move relative to said casing, and maintained in gas tight communication therewith.

11. A rotatable reaction chamber provided with means for rotating it, discharge means for products of reaction, and sealing means for an end of the chamber comprising a substantially vertically arranged annular packing means with packing therein spaced at some distance from the end of the reaction chamber, and an intermediate heat radiating member attached to the end of the reaction chamber and means adapted to engage said packing to make a sealed joint therewith.

12. In a reaction chamber packing for an end thereof, such packing being maintained at a distance from the end of the reaction chamber and another packing holding device attached to the reaction chamber and bridging the distance between it and the first said packing, and coöperating with the said first packing to make a tight joint.

13. A rotatable reaction chamber having at an end thereof a packing holding member provided with a packing ring on the outer face and a stationary element with respect to which the said chamber and said packing ring rotate and having thereon complementary packing holding means with packing therein registering with said first packing ring, the first said packing holding element having heat radiating surfaces.

14. A rotary reaction chamber having attached at one end a packing holding member having flanges spaced apart, means on one of the flanges for attaching the packing holding means to the chamber, and a packing ring on the outer face of the other flange, in combination with a stationary packing holding member having a face provided with packing registering with the rings on the outer face of the flange of the first packing holding member.

15. A rotary reaction chamber provided at one end with a bearing ring and means against which the ring bears and with respect to which it may rotate, the outer face of said ring being provided with packing holding means and with packing therefor, and a stationary member provided with packing holding means and packing therefor registering with said bearing ring.

16. A rotary reaction chamber provided at one end with means for discharging products of reaction and with means for interiorly delivering material to be reacted upon, such feeding means comprising a chute extending into the reaction chamber from the outside through said product delivering means, and packing around said chute sealing it in the said product discharging means.

17. A rotary reaction chamber provided at one end with means for discharging products of reaction and with means for interiorly delivering material to be reacted upon, such feeding means comprising a chute extending into the reaction chamber from the outside through said product delivering means, a conveyer in said chute with means for operating the same, and a packing around said chute sealing it in the said product discharging means.

18. A rotary reaction chamber carrying packing holding elements at one end with packing therein, complementary packing holding elements with packing therein adjacent thereto, packing pressure means on one of the packing holding elements and means whereby one of the packing holding elements may be moved axially toward and from the said reaction chamber.

19. A rotary reaction chamber open at an end and provided with sealing means comprising a packing holding member with packing therein and arranged to rotate with the chamber, relatively stationary packing holding means with packing therein adjacent the first mentioned packing, and means for moving the second mentioned packing holding means axially of the reaction chamber.

In testimony whereof, I affix my signature hereto.

ERNEST W. WESCOTT.